United States Patent [19]

O'Neill

[11] 3,739,104

[45] June 12, 1973

[54] KEY TELEPHONE SYSTEM SIGNALING CIRCUIT

[75] Inventor: John Francis O'Neill, Boulder, Colo.

[73] Assignee: Bell Telephone Laboratories, Incorporated, Murray Hill, Berkeley Heights, N.J.

[22] Filed: Aug. 18, 1971

[21] Appl. No.: 172,824

[52] U.S. Cl. ................................................ 179/81 C
[51] Int. Cl. ............................................ H04m 1/00
[58] Field of Search ............ 179/81 R, 81 C, 84 L, 179/99, 42

[56] References Cited

UNITED STATES PATENTS

| | | | |
|---|---|---|---|
| 3,453,396 | 7/1969 | Lacey | 179/81 C |
| 3,239,610 | 3/1966 | Morse | 179/27 CA |

*Primary Examiner*—Kathleen H. Claffy
*Assistant Examiner*—David L. Stewart
*Attorney*—W. L. Keefauver and James Warren Falk

[57] ABSTRACT

A combined key telephone set line lamp and line pickup key signaling circuit allows illumination of the line lamp while enabling the lamp illumination lead to carry the control information found on the usual A lead of key telephone sets. In the telephone set or at the end of the telephone station cable a single diode in series with the lamp permits illumination of the iine lamp by pulsed ground potential on the illumination lead but normally blocks a source of dc potential connected to the lamp through the diode from the illumination lead. The operation of the line pickup key shunts the diode and between successive ground pulses the dc potential is detected on the illumination lead.

10 Claims, 1 Drawing Figure

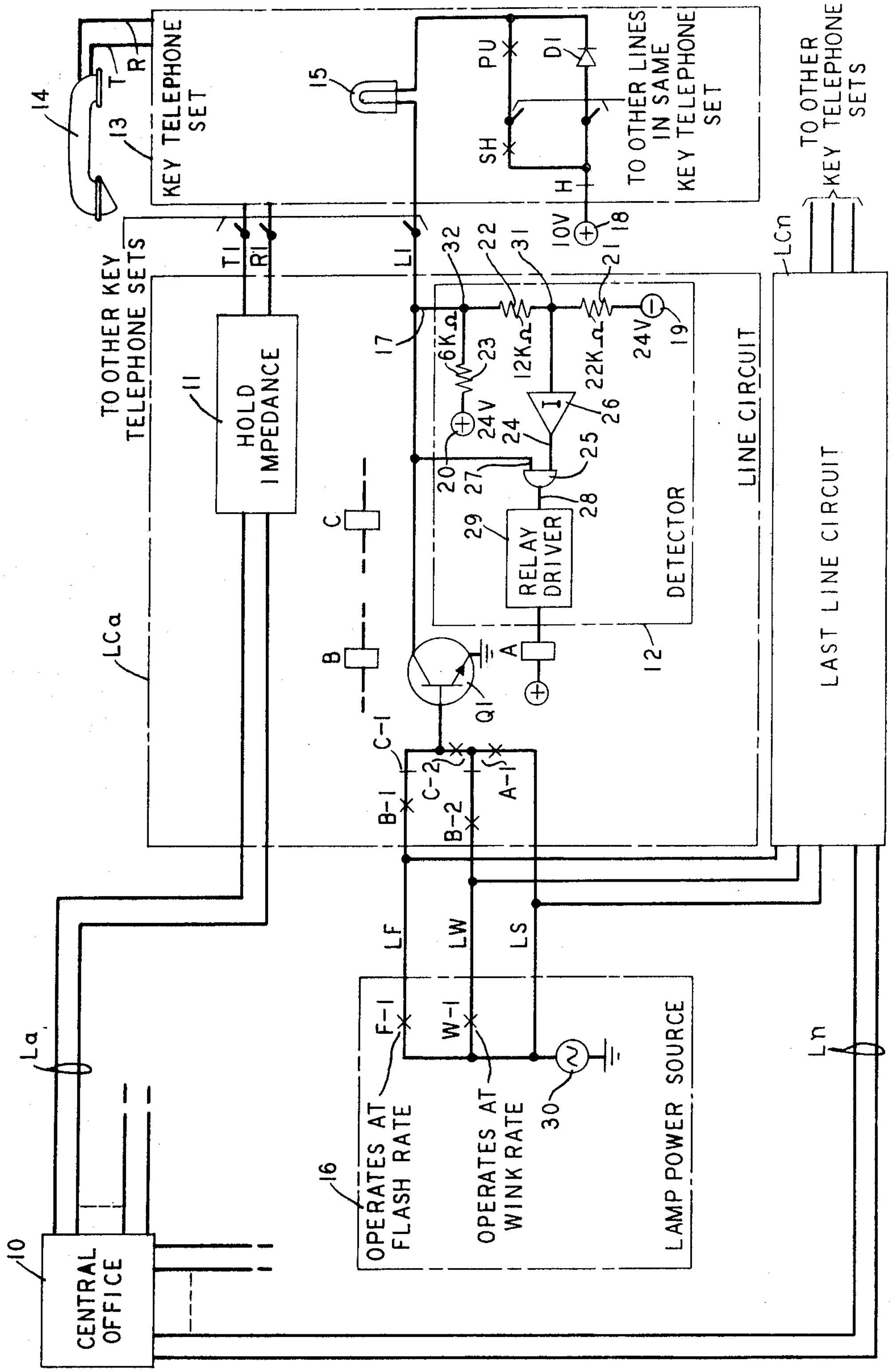
KEY TELEPHONE SET
TO OTHER LINES IN SAME KEY TELEPHONE SET
TO OTHER KEY TELEPHONE SETS
HOLD IMPEDANCE
LINE CIRCUIT
DETECTOR
RELAY DRIVER
LAST LINE CIRCUIT
OPERATES AT FLASH RATE
OPERATES AT WINK RATE
LAMP POWER SOURCE
CENTRAL OFFICE

KEY TELEPHONE SYSTEM SIGNALING CIRCUIT

FIELD OF THE INVENTION

This invention relates to key telephone signaling systems and more particularly to an arrangement utilizing a single lead for illuminating a line lamp and for transmitting control signals between a key telephone set and an associated line circuit.

BACKGROUND OF THE INVENTION

A key telephone system enables several key-equipped telephone sets to share access to two or more individual telephone lines by proper key manipulation. Each of the telephone lines from a central office usually is connected to a key telephone system through an individual line circuit. The line circuit, controlled by the central office, initiates a ringing signal at one or more of the sets of the key telephone system and lights a line lamp associated with a translucent line pickup key at each of the sets. Keys at the sets may be selectively operated for causing connection of a line to a handset, to establish a hold condition on the line, and to illuminate the respective line lamp for indicating that a particular line is picked up, held or released.

Typically each key telephone is connected to each line circuit through individual sets of tip and ring transmission leads, a so-called line lamp power lead and a so-called A lead. The lamp power lead carries various patterns of power pulses from the line circuit to the line lamps on the associated key telephone sets, producing distinct visual signals indicative of the ringing, answered or hold states of the line. The A lead is connected to or disconnected from ground by manipulating the line pickup key and the hold key at one of the telephone sets to energize or release an A relay which, when taken with the condition of the tip and ring leads, enables the line circuit to detect answer, hold, and hang-up conditions at the key telephone sets. The line circuit responds to signals on the A lead to provide lamp illumination appropriate to the new status of the line. A typical prior art key telephone system embodying these features is described in more detail in L. H. Allen, "The 1A1 Key Telephone System," *Bell Laboratories Record*, Vol. 34, No. 4, pp. 140–142, April 1956.

According to such prior art, four leads are required to connect a line circuit to each telephone set. In installations, such as an airline terminal, which require a large number of lines and an even larger number of telephone extensions, the elimination of even one of these four leads results in substantial savings in both space and cost.

U.S. Pat. No. 3,453,396, issued July 1, 1969 to Joseph C. Lacey and James R. McEowen discloses a method for eliminating one of the four leads required between a line circuit and a key telephone set. The usual A lead is eliminated and the signals normally transmitted on the A lead are multiplexed onto the line lamp power lead. This is accomplished by employing the bidirectional nature of the alternating current which is used to light the line lamp. Each key telephone set appearance of a line requires two diodes and two pickup key contacts which function with the alternating current to permit illumination of the lamp while providing signaling information as to the state of the pickup key. Depending upon the state of a line pickup key when a key telephone set is off-hook, one of the two diodes is switched in a series connection with the line lamp power lead. As a result, current to light the lamp is passed in one direction through the power lead when the line key is unoperated (ringing state) and in the opposite direction through the power lead when the line pickup key is operated (answer state). A current polarity detector in the line circuit, incorporating two more diodes in series with the power lead and a transistorized monostable multivibrator, detects the polarity of the current flowing through the line lamp power lead. Upon detection of a reversal in current appropriate supervisory signals and switching functions are generated for controlling the call. When the line is idle the detector continues to monitor for the key telephone set going off-hook with a pickup key operated. This is accomplished by continuously applying an alternating voltage through a resistor to the power lead. This allows the detector to monitor for a reversal in current flow while advantageously keeping the current below the illumination threshold of the lamp, but it undesirably results in a continuous power drain which is appreciable, particularly in large key telephone installations.

Thus, while the Lacey patent eliminates one lead between a line circuit and an associated key telephone set, two diodes and two key contacts are required in each telephone set and there is continuous current drain through the line lamps of idle key telephone sets.

SUMMARY OF THE INVENTION

The foregoing deficiencies of continuous power consumption and multiplicity of key contacts and diodes are solved by providing, in a specific illustrative embodiment, a transistor gating circuit which cooperates with a single diode and single key contact to furnish lamp illumination signals as well as supervisory signals to a detector over a single lead. The diode is connected in series with the line lamp and in parallel with a normally opened contact of a line pickup key. The line lamp is energized at different rates or lit steady for indicating the ringing, answered, or hold states of the telephone line. The energization of the lamp is accomplished in the line circuit by a gating transistor which applies a rapidly pulsing ground potential to the line lamp power lead. Each application of ground potential to the power lead advantageously forward-biases the diode causing current to flow through the diode and the lamp to a source of positive potential. When the gating transistor is off, the diode is reverse-biased by the positive potential which is thereby blocked from the lamp power lead. According to a feature of my invention, the diode is shunted by the parallel contact of the pickup key when the key is operated to apply the positive potential through the lamp to the power lead between successive ground pulses. Thus the positive potential on the power lead during the interpulse intervals provides the appropriate supervisory signal for further control over the call.

According to another feature of my invention, I provide each line circuit with a supervisory signal detector which is advantageously effective only when the gating transistor is off, to detect during the interpulse interval the operation of the line pickup key by the presence of the aforementioned positive potential on the lamp power lead.

It is a further feature of my invention that the diode virtually eliminates the prior art problem of steady state supervisory current flowing through the line lamp when the telephone line is in the idle state.

DRAWING DESCRIPTION

The foregoing features of my invention will become more apparent upon consideration of the following description in conjunction with the single FIGURE which is a schematic diagram of a key telephone system incorporating my invention.

DESCRIPTION OF ILLUSTRATIVE EMBODIMENT

Considering the drawing, a plurality of lines L*a* to L*n* extend from a central office to corresponding line circuits LC*a* to LC*n* of the key telephone system. The illustrative embodiment of my invention has been integrated, by way of example, into a key telephone line circuit as described in C. E. Morse et al. U.S. Pat. No. 3,239,610 of Mar. 8, 1966. For simplicity in presentation, only those structural and operational details of the Morse patent which are needed for a complete understanding of my invention are presented herein.

The key telephone system has a conventional lamp power source 16 common to line circuits LC*a* to LC*n*, that provides the steady and flashing signals that respectively characterize the off-hook, ringing, and holding line conditions conventionally utilized in key telephone systems. For further simplicity, only one line circuit LC*a* is shown in detail in the FIGURE. Line circuit LC*a* includes control relays A, B, and C and hold impedance 11 whose operations and functions are fully described in the Morse patent. Only one key telephone set 13 is shown in the drawing. Key telephone set 13 includes the usual handset 14, switchhook contact SH, hold key contact H, and a line lamp 15, but contains only one line pickup key contact PU per line.

In accordance with this specific embodiment of my invention line lamp power lead L1 is used to carry both illumination power to illumination power to lamp 15 and supervisory signaling to line circuit LC*a* when set 13 is off-hook on line L*a*. Power source 16 and gating transistor Q1 cooperate to apply a pulsing ground potential to lead L1 to illuminate lamp 15 at appropriate times. Diode D1 is forward-biased during successive ground pulses and permits lamp illumination current to flow but is reverse-biased and blocks positive potential 18 from being applied through lamp 15 to lead L1 between successive ground pulses. When key telephone set 13 is off-hook and connected to line La, diode D1 is shunted by pickup key contact PU and switchbook contact SH, and potential 18 is applied through lamp 15 to lead L1 between successive ground pulses. The presence of potential 18 on lead L1 between successive ground pulses indicates set 13 is off-hook on line L*a* and is the supervisory signal which is detected at line circuit LC*a* by detector 12.

IDLE

In the idle state line, circuit LC*a* is idle with relay A, B, and C unoperated and key telephone set 13 is on-hook. Line lamp 15 is not illuminated and detector 12 continuously monitors lead L1 for the supervisory signal indicating that telephone set 13 is off-hook on line L*a*.

With relays A, B and C unoperated, there is no input to the base of gating transistor Q1 and, as a result, it does not turn on to energize lamp 15. In detector 12 the voltage division of potential sources 19 and 20 across resistors 21, 22, and 23 creates positive potentials at the junction 31 of resistors 21 and 22 and the junction 32 of resistors 22 and 23. The magnitude of the potential at junction 32 is greater than positive potential 18 connected to set 13. The potential at junction 32 is applied via input lead 17 to lead L1 where it is also applied to input 27 of AND gate 25 in detector 12. In set 13 switchhook contact SH and pickup key contact PU are unoperated so diode D1 is not shunted. As the potential on lead L1 at this time is more positive than potential 18, diode D1 is reversed-biased preventing all but leakage current flow through lamp 15. In accordance with my invention no steady state current needs to flow through lamp 15 for supervisory purposes.

Relay A is unoperated as both inputs 24 and 27 to AND gate 25 are not concurrently at a positive potential (high) so there is no output to activate relay driver 29 to operate relay A. Input 27 to gate 25 is at a positive potential (high), as priorly described. Input 24 is low because junction 31 is at a positive potential, as priorly described, but inverter 26 inverts it to a low of input 24 to gate 25.

RINGING

When there is an incoming call on line L*a* a ringing signal transmitted on line L*a* from central office 10 energizes relay B in line circuit LC*a* and rings key telephone set 13 in a manner as described in the Morse patent. Relay B causes line lamp 15 to be flashed at a ½ second ON-OFF rate indicating the ringing state. In accordance with this specific embodiment of my invention lead L1 carries the energization for lamp 15 during the positive half cycles of generator 30 and during the ½ second period when lamp 15 is to be illuminated. During the negative half cycles of generator 30 and during the ½ second period when lamp 15 is not to be illuminated detector 12 monitors lead L1 for a supervisory signal indicating the incoming call on line L*a* has been answered at set 13.

To flash lamp 15 at the ½ second ON-OFF rate for indicating the incoming call on line L*a*, transistor Q1 is energized over a path through generator 30, flash rate pulsing contact F–1, lead LF, operated make contact B–1, and released break contact C–1. When contact F–1 is closed transistor Q1 is turned on for only the positive half cycles of generator 30. When transistor Q1 is turned on, ground potential is applied to lead L1 causing diode D1 to be forward-biased and current flows through lamp 15. Lamp 15 appears to be lit steady during the ½ second period when contact F–1 is closed as lamp 15 is incapable of extinguishing during the negative half cycles of generator 30 when transistor Q1 is turned off.

During the periods when transistor Q1 is turned on detector 12 cannot detect if set 13 is off-hook on line L*a*. The ground potential placed on lead L1 by transistor Q1 is applied to input 27 of AND gate 25 making it low and is also applied to junction 32 of the voltage divider network consisting of resistors 21, 22 and 23. The voltage division of negative potential 19 across resistors 21 and 22 to the ground potential at junction 32 makes junction 31 become of negative potential which is inverted by inverter 25 to make input 24 of gate 25 high. Thus gate 25 has input 25 low and input 24 high resulting in output 28 being low. Accordingly, relay driver 29 does not operate relay A.

During the periods when transistor Q1 is off detector 12 monitors lead L1 for the supervisory signal indicating set 13 is off-hook on line L*a* to answer the call thereon. However, in the ringing state the supervisory signal is not returned, and the same condition exists as in the priorly described idle state wherein relay A is not operated.

ANSWER

When a call on line *La* is answered at key telephone set 13 line lamp 15 is steadily illuminated indicating that the call on line *La* is answered. In accordance with this specific embodiment of my invention lead L1, which carries the energization for lamp 15 during positive half cycles of generator 30, also carries the input supervisory signal indicating the call is answered at set 13 to detector 12 during negative half cycles of generator 30. Specifically, when set 13 is off-hook on line *La*, potential 18 is bypassed around diode D1 by pickup key contact PU and switchhook contact SH. With diode D1 bypassed detector 12 is able to sense potential 18 on lead L1 and then operate relay A in response thereto. As more fully described in the aforementioned Morse patent, relay A, when operated, causes relay B to release and relay C to operate. Contacts of operated relays A and C complete the connection between line *La* and handset 14 over leads T1 and R1.

To answer a call on line *La* the locking pickup key associated with line *La* is operated and handset 14 is taken off-hook. As a result, switchhook contact SH and pickup contact PU shunt diode D1. Positive potential 18 is bypassed around diode D1 to be applied through line lamp 15 to lead L1 during the negative half cycles of generator 30 when transistor Q1 is off. Potential 18 on lead L1 makes input 27 to AND gate 25 positive. At the same time potential 18 is applied by input 17 to junction point 32 in detector 12. This changes the voltage division across resistors 21, 22, 23, causing junction point 31 to change from positive to negative polarity. As a result inverter 26 makes input 24 to gate 25 positive. Thus inputs 24 and 27 to gate 25 are both high making output 28 high, causing relay driver 29 to operate relay A. During the positive half cycles of ac generator 30 when transistor Q1 is on inputs 24 and 27 of gate 25 are not high simultaneously as described for the ringing state and relay driver 29 does not energize relay A. However, relay A remains operated during the positive half cycles of generator 30 as it has a sufficiently long release time to remain operated till the negative half cycle when it is again energized. The release of relay B disconnects the flashing ringing signal from lamp 15 by opening contact B–1. Relays A and C cause lamp 15 to be effectively lit steadily by transistor Q1 over a path through generator 30, lead LS, and make contacts A–1 and C–2 to the base of transistor Q1.

At this point the dual use of lead L1, in accordance with my invention should again be noted. In the IDLE and RINGING states when diode D1 is unshunted, inputs 24 and 27 to gate 25 are never high together, although lamp 15 is energized to indicate ringing. As soon as handset 14 is off-hook on line *La* pickup key contact PU and switchhook contact SH shunt diode D1, still allowing energization of lamp 15 during the positive half cycles of generator 30 but returning positive potential 18 through lamp 15 to lead L1 during the negative half cycles of generator 30. Inputs 24 and 27 to gate 25 are both high at this time and relay A is operated. In summary lamp 15 is energized over lead L1 during the positive half cycles of generator 30 and the answering of the call is detected over lead L1 during the negative half cycles of generator 30.

HOLD

When line *La* is placed on hold, the illumination of line lamp 15 is changed from a steady to a flashing rate. To establish a hold condition on busy line *La*, the nonlocking hold key is momentarily depressed interrupting the energization path of lamp 15 at break contact H. The release of the hold key automatically releases the operated pickup key PU in a well-known mechanical manner and thereby removing the shunt from diode D1 at contact PU. As priorly described with respect to the ringing state, unshunted diode D1 prevents the application of positive potential 18 to lead L1 when transistor Q1 is off and relay A will be released as inputs 24 and 27 of AND gate 25 are not concurrently high. As described more completely in the Morse patent the release of relay A with handset 14 off-hook on line *La* causes relay B to operate and relay C to remain operated. The release of relay A with relays B and C operated renders effective the hold impedance 11 across line *La* and causes the disconnection of handset 14 from line *La*. The opening of make contact A–1 ceases the steady energization of lamp 15, but lamp 15 is now flashed at a wink rate indicating the hold condition on line *La*. Transistor Q1 is energized to illuminate lamp 15 at the wink rate over a path through generator 30, wink rate pulsing contact W–1, lead LW make contact B–2, break contact A–1, and make contact C–2 to the base terminal of transistor Q1. During negative half cycles of generator 30 and periods when contact W–1 is open, when transistor Q1 is not on, detector 12 continues to monitor lead L1 for the presence of potential 18 which indicates the pickup key has been reoperated to remove the hold condition on line *La*.

TERMINATING A CALL

When key telephone set 13 goes on-hook to terminate the call on line *La*, the supervisory signal indicating set 13 is off-hook on line *La* is removed from lead L1. Detector 12 then releases relay A causing line lamp 15 to be extinguished. As described in the Morse patent relay A releases relay C and opens the connection between line *La* and leads T1, R1.

To terminate an existing call handset 14 is placed on-hook, opening switchhook contact SH which removes the shunt from diode D1. As previously described with respect to the ringing state, when diode D1 is not shunted potential 18 is not present on lead L1 when transistor Q1 is off. Thus, inputs 24 and 27 of AND gate 25 are not high at the same time, and relay A is released releasing relay C. With all relays released, there is no input to transistor Q1 from lamp power source 16, and lamp 15 is dark. Line *La* is now in the priorly described idle state.

INITIATING A CALL

When a call is initiated on idle line *La* the supervisory signal indicating the off-hook condition of set 13 on line *La* is present on lead L1 causing detector 12 to operate relay A. Lamp 15 is then steadily illuminated.

To initiate a call from set 13 over line *La*, the pickup key associated with line *La* is operated and handset 14 is taken off-hook. Pickup key contact PU and switchhook contact SH shunt diode D1 and positive potential 18 are applied through lamp 15 to lead L1. As priorly described with respect to the answer state, the presence of potential 18 on lead L1 when transistor Q1 is not conducting make both inputs 24 and 27 to AND gate 25 high and relay driver 29 operates relay A. As described in the Morse patent, relay A operates relay C and causes line L*a* to be connected through handset 14. The operation of relays A and C provides a path through make contacts A–1 and C–2 to energize transistor Q1 which illuminates lamp 15 steady. The called number can now be dialed.

It is to be understood that the circuit described is merely illustrative of the principles of the invention. A wide variety of modifications thereto may be effected by persons skilled in the telephone art without departing from the spirit and scope of the invention.

What is claimed is:

1. In a key telephone set circuit having a line lamp,
a signaling conductor,
a unidirectional conducting device in series with said lamp and said conductor, and means applying successive signals to said conductor, said signals energizing said lamp to an illuminated state,
the improvement comprising
a line pickup key including means operable for electrically bypassing said device to supply a supervisory signal to said conductor during the interval between said successive energizing signals, and
a resistive network connected between a source of negative and positive potentials, said network being connected to said signaling conductor for rendering said device nonconductive and to receive said supervisory signal.

2. The key telephone set circuit in accordance with claim 1 further comprising means responsive to said supervisory signal for generating a functional output signal indicative of the actuation of said bypassing means.

3. The key telephone set circuit in accordance with claim 2, wherein said generating means comprises,
a supervisory relay,
a relay driver activatable for operating said relay, and
gating means responsive to said supervisory signals for activating said relay driver.

4. The key telephone set circuit in accordance with claim 3, wherein said unidirectional conducting device consists of a diode.

5. The key telephone set circuit in accordance with claim 4, wherein said bypassing means includes a contact of said line pickup key.

6. The key telephone set circuit in accordance with claim 5, wherein said applying means includes a plurality of relay devices having a plurality of contacts, and a transistor gating arrangement having an output connected to said supervisory conductor, said gating arrangement having an input connected to a configuration of said contacts for supplying a plurality of selectable lamp energizing signals to said supervisory conductor.

7. A key telephone circuit,
a line lamp having a first and a second terminal,
a first source of potential,
a diode connecting said first terminal and said first potential source,
a second source of potential resistively connected to said second terminal, said second potential being of the same polarity but of higher magnitude than said first potential, and said diode being poled to prevent current flow between said first and said second sources of potential,
a line pickup key operable to shunt said diode and and apply said first potential through said lamp to said second terminal to shunt down said second source of potential,
driver means applying successive signals to said second terminal for steadily illuminating said lamp, and
means connected to said second terminal for detecting a change in potential on said second terminal during the interval between successive energizing signals.

8. A key telephone circuit in accordance with claim 7 wherein said detecting means includes
a third source of potential,
voltage divider means connected between said third potential source and said second terminal, said divider means having a third terminal, and
logic means having a first input connected to said second terminal and a second input connected to said third terminal for detecting a prescribed electrical condition on said second terminal.

9. A key telephone line circuit for use in a key telephone system in which successive lamp energizing signals are sent over a single conductor to a key telephone station set lamp connected in series with a unidirectional conducting device thereat and in which a supervisory signal originated at the set is returned over said conductor by short-circuiting said device resulting in rendering said device nonconductive while short-circuited and resulting in the application of said supervisory signal to said conductor during the intervals between said successive signals, said line circuit comprising
a resistive network connected between a first and a second source of potential and having a first and a second junction, said first junction of said network being connected to said conductor via a single connection thereto for receiving said supervisory signal, and
means connected to both said first and said second junction for detecting said supervisory signal.

10. A key telephone station set arrangement for use in a key telephone system in which successive station set lamp signals and a supervisory signal are multiplexed on a single conductor connecting a station set to key telephone equipment comprising
a station set line lamp connected to said single conductor,
a source of supervisory signal at said station set,
a unidirectional conducting device connecting said lamp and said source of supervisory signal, said device being connected to block said source of supervisory signal from said lamp and said conductor,
a line pickup key at said station set, and
means responsive to the operation of said key for short-circuiting said device to render said device nonconductive while said key is operated and wherein said short-circuiting means also applies said source of supervisory signal to said conductor.

* * * * *